Jan. 10, 1939.  S. H. GIBSON  2,143,348
WINDING SHAFT HOOK
Filed Feb. 5, 1938
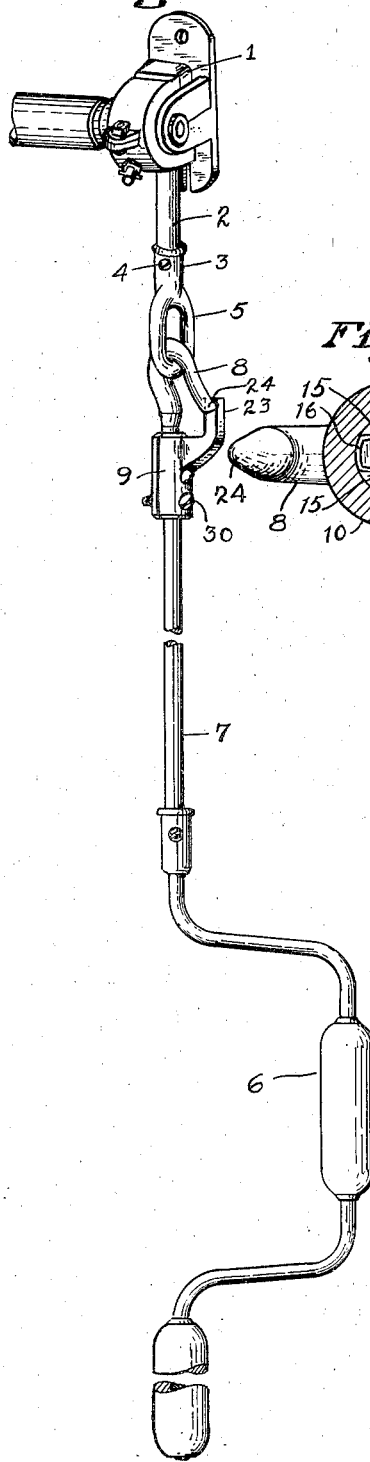
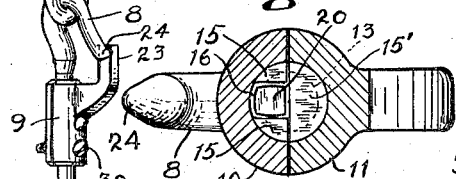
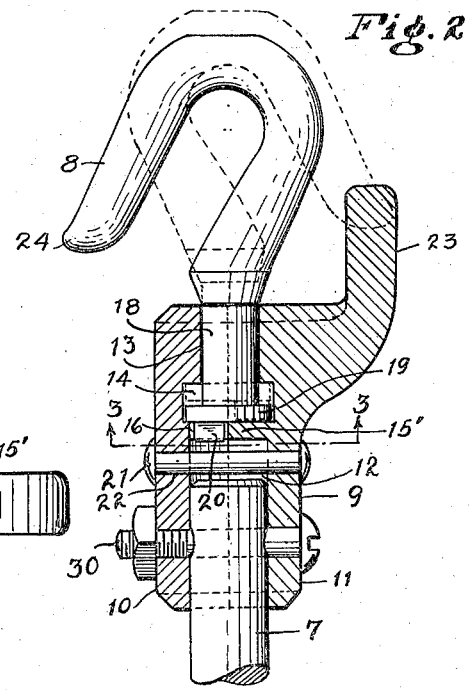
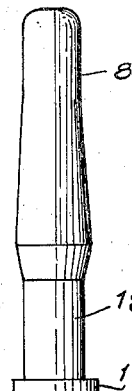
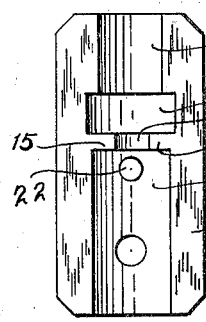
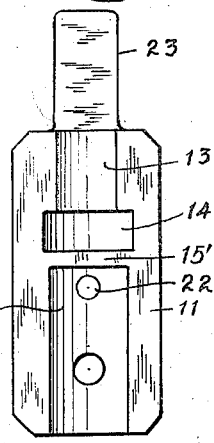
INVENTOR.
SAMUEL H. GIBSON.
BY
*Richey & Watts*
ATTORNEYS.

Patented Jan. 10, 1939

2,143,348

UNITED STATES PATENT OFFICE 2,143,348

WINDING SHAFT HOOK

Samuel H. Gibson, Lakewood, Ohio, assignor to The Fanner Manufacturing Company, Cleveland, Ohio, a corporation of Ohio Application February 5, 1938, Serial No. 188,945

7 Claims. (Cl. 64—19)

This invention relates to improvements in awning raising and lowering mechanisms and more particularly to a connector for connecting the winding brace shaft to the worm shaft of the awning roller operating mechanism.

Awnings, such as are used on store fronts and the like, are usually raised or lowered by rolling or unrolling the awning fabric onto or off of a roller rotatably supported in bearings on front of a building. The winding or turning mechanism for the roller usually comprises a reduction gearing including a worm gear secured to the awning roller and rotated by a worm in mesh with the worm gear. The gears may be supported in a gear box and the worm is usually carried by a shaft journalled in bearings and having one end which extends through the wall of the gear box. The end of the shaft is provided with either a hook or an eye, and the winding brace usually has a shaft extension which terminates in a hook or eye which may be connected to the eye on the worm shaft for transmitting turning torque to the same.

Because the above mechanism for turning the roller is well above the sidewalk level, it often presents considerable difficulty in engaging the cooperating hook and eye on the worm shaft and brace shaft, but what is more important, especially in large awnings, the torque which must be applied from the winding shaft to the worm shaft, often causes the hook and eye to become disengaged from each other. This disengagement occurs most often when the greatest torque is being applied and when the hook slips out of the eye, the end of the shaft often strikes against the glass of the window breaking the same. This action is particularly prone to occur where the winding shaft is relatively long.

It is therefore the purpose of this invention to provide a coupling device for the brace and worm shafts which cannot accidentally become disengaged and further wherein the operator need only to turn the brace and need not divide his attention between turning the brace and maintaining the operative connection between the various parts.

Although the invention about to be described, is particularly adapted for use with the awning mechanism described, it is to be understood that the connector may be used in other places and for other purposes and is not limited specifically to awning mechanisms.

Still other advantages of the invention and the invention itself, will become more apparent from the following description of an embodiment thereof, which description is illustrated by the accompanying drawing and forms a part of this specification.

In the drawing:

Fig. 1 is a perspective view of the connection of my invention showing the same attached to the brace and worm shafts of an awning raising mechanism;

Fig. 2 is a vertical medial section of the coupling with the hook in elevation and showing in dotted lines the position taken by the hook during the winding operation;

Fig. 3 is a section taken on the lines 3—3 of Fig. 2;

Figs. 4 and 6 are elevational views showing the inside of the matched socket parts; and Fig. 5 is a rear elevational view of the hook.

Referring now to the drawing, throughout which like parts are designated by like reference characters.

As best shown in Fig. 1, the gear box 1 which may be secured to the face of the building provides a housing for worm and gear (not shown), the awning roller being fastened to the worm gear and the worm being disposed on the worm shaft which extends through the bottom of the gear box and is provided on its end with a worm shaft eye which comprises a socket 3 secured to the shaft 2 by a rivet or bolt 4, and has an elongated eye 5 at its extremity.

The shaft 2 is usually relatively short and may not necessarily extend in a vertical position, but may extend obliquely from the gear box, such gear box and shafts being well known.

As previously stated, the awning is raised by turning the roller which is accomplished by rotating the shaft 2. The shaft 2 is rotated by a brace, designated generally at 6, which has connected thereto an extension shaft 7 which is usually relatively long since it has to extend upward a sufficient distance in order to enable the connecting hook to be engaged with the eye on the worm shaft.

The coupling comprises generally a hook 8 adapted to be engaged with the eye 5 and a socket 9 for holding and turning the hook. The socket includes a pair of matched socket halves 10 and 11 (Figs. 4 and 6) which are formed complementary to provide a cylindrical bore 12 extending upwardly into the socket slightly past the midsection. The upper end of the socket halves are formed to provide a restricted cylindrical opening 13 extending from the upper end of the socket downward and terminating in an enlarged cylindrical chamber 14. A wall of material 15 and 15' remains between the sockets 12 and the channel or chamber 14. The wall 15 of the part 10 is provided with a notch 16 therethrough extending from the edge to the periphery of the channel 14.

The hook 8 has a cylindrical stem which terminates in a narrow circular flange 19. A radial lug 20 is provided on the bottom of the flange extending downward and is of substantially the same configuration as the notch 16 in the socket portion 10.

The socket parts and hook are assembled by inserting a bolt or rivet 21 through the apertures 22 in the socket halves, which rivet 21 holds the parts together. The shaft 7 is held in the socket by a bolt 30 extending through the walls of the socket and the end of the shaft. The base of the hook with the stem 18 and flange 19 is disposed in the channel 13 and chamber 14 respectively. The diameter of the stem 18 and flange 19 is slightly smaller than the openings 13 and 14 respectively so that any reciprocating or rotative movement thereof is facilitated in the socket. The thickness of the flange 19 and the length of the cylinder 14 are such that a predetermined amount of longitudinal movement of the stem and head is possible.

When the hook is rotated in the socket, the lug 20, when it registers with the notch 16, as best shown in Figs. 2 and 3, permits the hook to drop or be moved down, the lug dropping into the notch 16. Engagement of the lug in the notch prevents further rotative movement of the hook in the socket. When the hook is raised longitudinally in the socket, the lug 20 is disengaged from the notch permitting relative rotative movement of the hook and socket.

The socket half 11 is provided with a laterally and upwardly extending arm 23 which is adapted to engage the point 24 of the hook 8 when the socket is turned about its axis.

The operation of the device is as follows:

The hook is turned so that the point 24 extends in the direction opposite to the arm 23 on the socket. In this position the lug 20 registers with the notch 16; the hook then may move downward in the socket allowing the lug to enter the notch, preventing further rotative movement of the hook in the socket. This causes the hook to remain stationary and the shaft and hook are raised and the hook easily engaged in the eye 5 of the worm shaft. After the hook has been engaged in the eye 5, the weight of the shaft and winding brace will be found to be sufficient to cause the hook to travel upwardly in the socket, disengaging the lug 20 from the notch 16. The shaft 7 is then rotated by the brace 6 which causes the socket and arm 23 to rotate around the base of the hook, the hook being held against rotation by engagement with the eye 5 until the arm 23 on the socket engages the point or end of the hook (note the dotted lines in Fig. 2 and the showing in Fig. 1). Obviously if the awning was being lowered, it will engage the end of the hook on one side, and if it is being raised, it will engage the hook on the opposite side. In either event the hook is turned by the arm 23 engaging the point of the hook and regardless of the movement of the brace and shaft by the operator, accidental disengagement of the hook from the eye is impossible.

When the winding operation has been completed, it is merely necessary to rotate the brace approximately 180° and the hook may then be lifted from engagement with the eye.

It will thus be seen that I have provided a foolproof mechanism for connecting the winding and worm shafts which positively prevents accidental disconnection and wherein the various deficiencies of the prior art devices are overcome.

Having thus described my invention, I am aware that numerous and extensive departures may be made therefrom but without departing from the spirit or scope of the appended claims.

I claim:

1. In a device of the class described, a body secured to the end of a shaft, a hook rotatably carried by the body, and means in said body to engage said hook for turning the hook.

2. In a device of the class described, a body formed to provide a socket, a hook rotatably journalled in said socket, an arm on said socket engageable with said hook.

3. In a device of the class described, a body adapted to be connected to a shaft, a hook rotatably carried by the body, an arm carried by the body and engageable with the hook to turn the same.

4. In a device of the class described, a body for the end of a shaft, a socket formed in said body, a hook rotatably journalled in said socket and extending beyond the body, and means on said body to engage the end of said hook to convert the same to an eye.

5. In a device of the class described, a body secured to a shaft, a socket formed in said body and a hook having a stem loosely journalled in said socket, and means on the end of the stem engageable with means in said socket to hold the hook in a predetermined position and releasable upon predetermined movement of the hook in the socket, and an arm on the body for engaging the end of the hook to transmit torque from the body to the hook when the body is rotated.

6. A connector for connecting said shaft to an eye on another shaft comprising a socket member secured to the first shaft, a hook having a headed stem in said socket, a lug on said stem, a socket formed with a recess in which said lug may engage, said stem being movable in said socket to disengage said lug from said recess, means on said socket member for transmitting torque from said member to the hook comprising an arm on the socket adapted to engage the end of said hook.

7. In a coupling for connecting two shafts together comprising an eye secured to one shaft, a hook adapted to be engaged in said eye and having a stem provided with an annular head at its end, a turning element for said hook comprising a body secured to the other shaft and formed to provide a socket having an annular chamber to receive said flanged stem, a lug on said stem, said socket formed with cooperating means for engaging said lug to hold said hook in a predetermined position, said lug being disengageable from said means upon predetermined movement of the stem in said socket, and means carried by said turning element positioned to engage and turn the hook upon turning of said element preventing disengagement of the hook from the eye during torque transmission periods.

SAMUEL H. GIBSON.